Aug. 19, 1947.   E. L. HARDER   2,426,018
CONTROL NETWORK
Filed Oct. 25, 1944

WITNESSES:
H. F. Sugser
Nw. C. Groome

INVENTOR
Edwin L. Harder.
BY O. B. Buchanan
ATTORNEY

Patented Aug. 19, 1947

2,426,018

UNITED STATES PATENT OFFICE 2,426,018

CONTROL NETWORK

Edwin L. Harder, Forest Hills, Pa., assignor to Westinghouse Electric Corporation, East Pittsburgh, Pa., a corporation of Delaware Application October 25, 1944, Serial No. 560,299

21 Claims. (Cl. 172—238)

My invention relates to new and highly efficient networks for obtaining positive or negative-sequence voltages.

An object of my invention is to provide a compensator-type network or combination, for deriving a positive-sequence voltage from a single phase of a three-phase line-voltage having no zero-sequence voltage-component, minus a compensator-voltage which is derived by passing line-current through impedance in such manner as to produce a voltage-drop equal to the negative-sequence voltage-component. This positive-sequence network or combination is particularly useful in a system in which the load on the positive-sequence terminals of the network is variable, and in which it is important to reduce the variation of the derived positive-sequence voltage at the load-terminals, when said load varies between zero and full-load. An example of such a variable positive-sequence load is a voltage-regulator of a type having a network consisting of various variable shunt-loads, connected by a serially-connected impedance, and all energized from the positive-sequence output-terminals of the positive-sequence network.

A still further object of my invention is to provide a current-compensator type of means, for deriving the negative-sequence component of a line-voltage, by causing a plurality of impedances to be traversed by two phases of a three-phase line-current, either delta or star or other type of current, the currents being either currents having no zero-sequence component or currents from which the zero-sequence component has been removed, and the impedances being so chosen as to produce substantially the same impedance-drop as is obtained by passing the negative-sequence line current through the negative-sequence impedance of the line up to the point at which the negative-sequence voltage is to be measured or derived.

Figure 6:
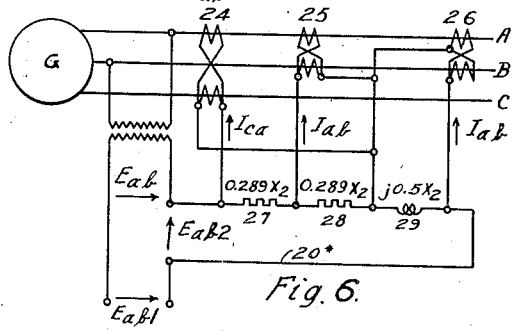
Figure 7:
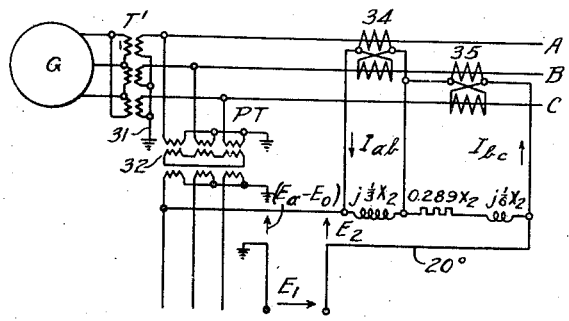
Figure 8:
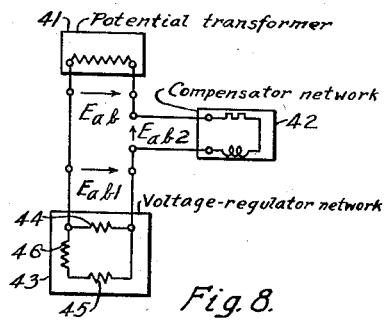

With the foregoing and other objects in view, my invention consists in the circuits, systems, combinations, apparatus, parts, and methods hereinafter described and claimed, and illustrated in the accompanying drawing, wherein Figs. 1 to 7 are diagrammatic views of circuits and apparatus comprising different illustrative forms of embodiments of a positive-sequence network or combination embodying my invention, and Fig. 8 is a still more diagrammatic view of a voltage-regulator system utilizing my invention, by which I mean a system in which the positive-sequence network feeds into a variable load, under conditions in which it is important to consider the variation of the derived voltage at the load-terminals, when the load of the voltage-regulator varies between zero and full-load.

Figure 1:
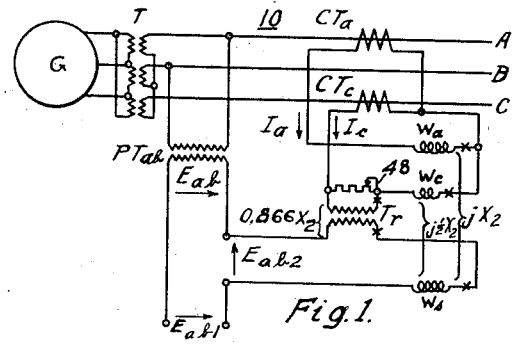

In Fig. 1, I have indicated a system in which the voltage of a three-phase line A, B, C is to be determined at some point 10. The particular line which is illustrated is energized by a polyphase generator G through a delta-star power-transformer T. I provide a potential-transformer $PT_{ab}$ for deriving the delta-voltage $E_{ab}$ from the line-conductors A and B. I also provide two line-current transformers $CT_a$ and $CT_c$ for deriving the star-phase line-currents $I_a$ and $I_c$, from the line-conductors A and C, respectively. I also provide certain impedances which will subsequently be described.

The phase-A and phase-B star-voltages of the line, in terms of the star-voltage phase-sequence components $E_0$, $E_1$ and $E_2$, are $$E_a = E_0 + E_1 + E_2 \qquad (1)$$

and $$E_b = E_0 + a^2 E_1 + a E_2 \qquad (2)$$

Hence the phase-AB delta-voltage is $$E_{ab} = (1-a^2) E_1 + (1-a) E_2$$
$$= E_{ab1} + E_{ab2} \qquad (3)$$

From this it follows that the positive-sequence delta-voltage is $$E_{ab1} = (1-a^2) E_1$$
$$= E_{ab} - E_{ab2}$$
$$= E_{ab} - (1-a) E_2 \qquad (4)$$

The negative-sequence star-voltage $E_2$ is $$E_2 = -I_2(R_2 + jX_2) \qquad (5)$$

where $I_2$ is the negative-sequence star-current and $(R_2+jX_2)$ is the negative-sequence impedance of the generator G and the transformer T, or, in general, the combined generator-and-line negative-sequence impedance up to the point at which the voltage is measured.

The negative-sequence current is $$I_2 = \tfrac{1}{3}(I_a + a^2 I_b + a I_c) \qquad (6)$$

It is known that $$I_a + I_b + I_c = 3I_0$$

or $$(I_a - I_0) + (I_b - I_0) + (I_c - I_0) = 0 \qquad (7)$$

It is also known that $$a + a^2 + 1 = 0 \qquad (8)$$

Hence, from Equations 6 and 8, the negative-sequence star-current is $$I_2 = \tfrac{1}{3}(I_a + a^2 I_b + a I_c) - \tfrac{1}{3}(1 + a^2 + a) I_0$$
$$= \tfrac{1}{3}[(I_a - I_0) + a^2(I_b - I_0) + a(I_c - I_0)] \quad (9)$$

By combining Equations 7 and 9, any one of the three currents $(I_a - I_0)$, $(I_b - I_0)$, or $(I_c - I_0)$ may be eliminated. Thus, from Equation 7, $$(I_b - I_0) = -(I_a - I_0) - (I_c - I_0) \quad (10)$$

which, substituted in Equation 9, gives the value of the negative-sequence star-current as $$I_2 = \tfrac{1}{3}[(1 - a^2)(I_a - I_0) + (a - a^2)(I_c - I_0)] \quad (11)$$

Combining Equations 4, 5 and 11 shows that the positive-sequence delta-voltage is $$E_{ab1} = E_{ab} + (1 - a)(R_2 + jX_2) I_2 \quad (12)$$
$$= E_{ab} + \tfrac{1}{3}(1 - a)(R_2 + jX_2)[(1 - a^2)(I_a - I_0) + (a - a^2)(I_c - I_0)]$$
$$= E_{ab} + (R_2 + jX_2)[(I_a - I_0) - a^2(I_c - I_0)]$$
$$= E_{ab} + R_2(I_a - I_0) + jX_2(I_a - I_0) - (\tfrac{1}{2}\sqrt{3} X_2 - \tfrac{1}{2} R_2)(I_c - I_0) + + j(\tfrac{1}{2} X_2 + \tfrac{1}{2}\sqrt{3} R_2)(I_c - I_0) \quad (13)$$

Instead of eliminating the current $(I_b - I_0)$ from Equations 9 and 10, we could have eliminated $(I_a - I_0)$ or $(I_c - I_0)$, yielding $$I_2 = -\tfrac{1}{3}[(1 - a^2)(I_b - I_0) + (1 - a)(I_c - I_0)] \quad (11')$$

or $$I_2 = \tfrac{1}{3}[(1 - a)(I_a - I_0) + (a^2 - a)(I_b - I_0)] \quad (11'')$$

whence $$E_{ab1} = E_{ab} - R_2(I_b - I_0) - jX_2(I_b - I_0) - (\tfrac{1}{2}\sqrt{3} X_2 + \tfrac{1}{2} R_2)(I_c - I_0) + - j(\tfrac{1}{2} X_2 - \tfrac{1}{2}\sqrt{3} R_2)(I_c - I_0) \quad (13')$$

or $$E_{ab1} = E_{ab} + (\tfrac{1}{2}\sqrt{3} X_2 + \tfrac{1}{2} R_2)(I_a - I_0) + j(\tfrac{1}{2} X_2 - \tfrac{1}{2}\sqrt{3} R_2)(I_a - I_0) + + (\tfrac{1}{2}\sqrt{3} X_2 - \tfrac{1}{2} R_2)(I_b - I_0) - j(\tfrac{1}{2} X_2 + \tfrac{1}{2}\sqrt{3} R_2)(I_b - I_0) \quad (13'')$$

Instead of starting out with the delta-voltage in phase-AB, we could have taken either of the other phases of the delta-voltages. Thus, $$E_{bc} = (a^2 - a) E_1 + (a - a^2) E_2$$
$$= a^2 E_{ab1} + a E_{ab2} \quad (3b)$$

or $$E_{ca} = -(1 - a) E_1 - (1 - a^2) E_2$$
$$= a E_{ab1} + a^2 E_{ab2} \quad (3c)$$

obtaining $$a^2 E_{ab1} = E_{bc} - (a - a^2) E_2$$
$$= E_{bc} - (\tfrac{1}{2}\sqrt{3} X_2 + \tfrac{1}{2} R_2)(I_a - I_0) - j(\tfrac{1}{2} X_2 - \tfrac{1}{2}\sqrt{3} R_2)(I_a - I_0) + - R_2(I_c - I_0) - jX_2(I_c - I_0) \quad (13b)$$
$$= E_{bc} + (\tfrac{1}{2}\sqrt{3} X_2 + \tfrac{1}{2} R_2)(I_b - I_0) + j(\tfrac{1}{2} X_2 - \tfrac{1}{2}\sqrt{3} R_2)(I_b - I_0) + + (\tfrac{1}{2}\sqrt{3} X_2 - \tfrac{1}{2} R_2)(I_c - I_0) - j(\tfrac{1}{2} X_2 + \tfrac{1}{2}\sqrt{3} R_2)(I_c - I_0) \quad (13b')$$
$$= E_{bc} - (\tfrac{1}{2}\sqrt{3} X_2 - \tfrac{1}{2} R_2)(I_a - I_0) + j(\tfrac{1}{2} X_2 + \tfrac{1}{2}\sqrt{3} R_2)(I_a - I_0) + + R_2(I_b - I_0) + jX_2(I_b - I_0) \quad (13b'')$$

or $$a E_{ab1} = E_{ca} + (1 - a^2) E_2$$
$$= E_{ca} + (\tfrac{1}{2}\sqrt{3} X_2 - \tfrac{1}{2} R_2)(I_a - I_0) - j(\tfrac{1}{2} X_2 + \tfrac{1}{2}\sqrt{3} R_2)(I_a - I_0) + + (\tfrac{1}{2}\sqrt{3} X_2 + \tfrac{1}{2} R_2)(I_c - I_0) + j(\tfrac{1}{2} X_2 - \tfrac{1}{2}\sqrt{3} R_2)(I_c - I_0) \quad (13c)$$
$$= E_{ca} - (\tfrac{1}{2}\sqrt{3} X_2 - \tfrac{1}{2} R_2)(I_b - I_0) + j(\tfrac{1}{2} X_2 + \tfrac{1}{2}\sqrt{3} R_2)(I_b - I_0) + + R_2(I_c - I_0 + jX_2(I_c - I_0) \quad (13c')$$
$$= E_{ca} - R_2(I_a - I_0) - jX_2(I_a - I_0) - (\tfrac{1}{2}\sqrt{3} X_2 + \tfrac{1}{2} R_2)(I_b - I_0) + - j(\tfrac{1}{2} X_2 - \tfrac{1}{2}\sqrt{3} R_2)(I_b - I_0) \quad (13c'')$$

By relettering the phases, and calling them C, A, B instead of A, B, C, Equations 13b, 13b' and 13b'' become identical with Equations 13', 13'' and 13, respectively. By relettering the phases, and calling them B, C, A instead of A, B, C, Equations 13c, 13c' and 13c'' become identical with Equations 13'', 13 and 13', respectively. We will confine our attention, therefore, to Equations 13, 13' and 13'', as the fundamental equations for star line-currents $I_a$, $I_b$ and $I_c$.

Equation 13 states that the positive-sequence delta-voltage may be obtained by passing the current $(I_a - I_0)$ through an impedance $(R_2 + jX_2)$, and passing the reversed current $-(I_c - I_0)$ through an impedance $$[(\tfrac{1}{2}\sqrt{3} X_2 - \tfrac{1}{2} R_2) - j(\tfrac{1}{2} X_2 + \tfrac{1}{2}\sqrt{3} R_2)]$$

and by adding the two impedance-drops to the delta line-voltage $E_{ab}$. Or the reversed current $-(I_c - I_0)$ may be passed through a resistance having a value $(\tfrac{1}{2}\sqrt{3} X_2 - \tfrac{1}{2} R_2)$, and the unreversed current $(I_c - I_0)$ may be passed through an inductive reactance $j(\tfrac{1}{2} X_2 + \tfrac{1}{2}\sqrt{3} R_2)$. Or the currents may be doubled and the impedances halved, or vice versa, etc. Actually, of course, as is well-known in relaying practice, when current-transformers CT and potential-transformers PT are used, the secondary ohms used for $R_2$ and $X_2$ must be the CT-ratio, divided by the PT-ratio, times the actual primary ohmic value of $R_2$ and $X_2$. It is usually more convenient to express the negative-sequence line-impedance $(R_2 + jX_2)$ as a percentage of the line-voltage at the full load (FL) line-current at the rated load of the generator.

Equation 13' states that the positive-sequence delta-voltage may be obtained by passing the reversed current $-(I_b - I_0)$ through an impedance $(R_2 + jX_2)$, and passing the reversed current $-(I_c - I_0)$ through an impedance $$[(\tfrac{1}{2}\sqrt{3} X_2 + \tfrac{1}{2} R_2) + j(\tfrac{1}{2} X_2 - \tfrac{1}{2}\sqrt{3} R_2)]$$

and by adding the two impedance-drops to the delta line-voltage $E_{ab}$.

Equation 13'' states that the positive-sequence delta-voltage may be obtained by passing the current $(I_a - I_0)$ through an impedance $$[(\tfrac{1}{2}\sqrt{3} X_2 + \tfrac{1}{2} R_2) + j(\tfrac{1}{2} X_2 - \tfrac{1}{2}\sqrt{3} R_2)]$$

and passing the current $(I_b - I_0)$ through an impedance $$[(\tfrac{1}{2}\sqrt{3} X_2 - \tfrac{1}{2} R_2) - j(\tfrac{1}{2} X_2 + \tfrac{1}{2}\sqrt{3} R_2)]$$

and by adding the two impedance-drops to the delta line-voltage $E_{ab}$.

The three currents $(I_a - I_0)$, $(I_b - I_0)$ and $(I_c - I_0)$ are the line-currents $I_a$, $I_b$ and $I_c$ from which the zero-sequence component has been removed. There are several means, well-known in the art, for deriving the line-currents less the zero-sequence components, and these means form no essential part of my invention. For convenience in illustration and description, I shall, therefore, illustrate my invention as being applied to a system in which there is no zero-sequence current, or $I_0 = 0$. Thus, in Fig. 1, neither the generator G nor the power-transformer T is grounded, and hence $I_0 = 0$.

In many cases, the resistance-component $R_2$ is negligibly small, in the negative-sequence line-impedance $(R_2 + jX_2)$ from the internal voltage of the generator G up to the point at which the line-voltage is to be measured. For simplicity of illustration, I shall therefore illustrate my invention as being applied to a system in which $R_2=0$, within the required limits of accuracy, with the understanding that the quantity $R_2$ may be taken into consideration, if necessary, in the manner indicated by the Equations 13, 13' or 13''.

The negative-sequence impedance $jX_2$ may have any value. By way of concrete illustration, I shall assume that $X_2$ is a 25% reactance, that the secondary voltage of the potential-transformer $PT_{ab}$ is 115 volts, and that the secondary current, in the secondary windings of the current-transformers $CT_a$ and $CT_c$ is 4 amperes at full load on the generator. Then the secondary impedance, corresponding to 100% line-impedance, will be $115/4=28.75$ ohms, and the ohmic value of the negative-sequence impedance $X_2$, to be used in the secondary circuit, is $$0.25 \times 28.75 = 7.19 \text{ ohms}$$

There are a number of ways in which the conditions of the fundamental Equations 13, 13' and 13'' may be fulfilled. By way of illustration, I shall indicate several forms of embodiment in which the conditions of Equation 13 may be fulfilled, with the understanding that the conditions indicated in either one of the other equations, 13' or 13'', may be applied in a similar manner.

Thus, in Fig. 1, I may provide a secondary resistor having a value $$\tfrac{1}{2}\sqrt{3}X_2 \text{ or } 0.866X_2$$

shunted by a transformer $T_r$ having a ratio 1:1. Or the resistor might have been $8.66X_2$ and the transformer-ratio 10:1, etc. This resistor is connected in circuit with the secondary current $I_c$ of the current-transformer $CT_c$, so as to produce a secondary potential $-0.866X_2I_2$ as required by the fourth term of the right-hand side of Equation 13. Polarity-marks, $x$, indicate the relative instantaneous polarities in the usual manner.

In Fig. 1, I also provide a three-winding mutual inductance having two primary windings $W_a$ and $W_c$ and a secondary winding $W_s$, with a mutual reactance $jX_2$ between $W_a$ and $W_s$, and a mutual reactance $j\tfrac{1}{2}X_2$ between $W_c$ and $W_s$, as indicated. The primary windings $W_a$ and $W_c$ are respectively connected in circuit with the secondary currents $I_a$ and $I_c$ of the current-transformers $CT_a$ and $CT_c$, respectively, and the secondary winding $W_s$ is connected in series with the secondary circuit of the resistance-shunting transformer $T_r$, in the secondary circuit 29 of the potential-transformer $PT_{ab}$.

Thus, in the operation of the voltage-deriving network shown in Fig. 1, the potential-transformer $PT_{ab}$ produces the secondary delta-voltage $E_{ab}$, and the resistance-shunting transformer $T_r$ and the reactor-secondary $W_s$ together produce the secondary negative-sequence voltage $$E_{ab2} = 0.866X_2I_c - jX_2I_a - j\tfrac{1}{2}X_2I_c \qquad (14)$$

which is subtracted from the delta-voltage $E_{ab}$ to produce the positive-sequence voltage $E_{ab1}$, as indicated in Fig. 1, and in conformity with Equation 13, still assuming a system in which $I_0=0$ and $R_2=0$.

Figure 2:
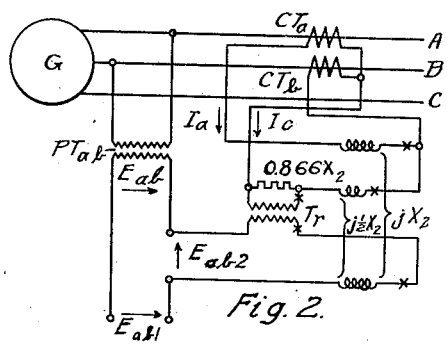

In Fig. 2, a similar positive-sequence voltage-circuit is shown, in which current-transformers $CT_a$ and $CT_b$ are utilized in line-phases A and B, instead of phases A and C as in Fig. 1. In Fig. 2, the phase-C current is obtained from the relation $$I_c = -I_a - I_b \qquad (7')$$

as indicated by the arrow $I_c$ in Fig. 2. The power-transformer T of Fig. 1 is not used in Fig. 2. Fig. 2 is otherwise the same as Fig. 1, and the operation is the same.

Figure 3:
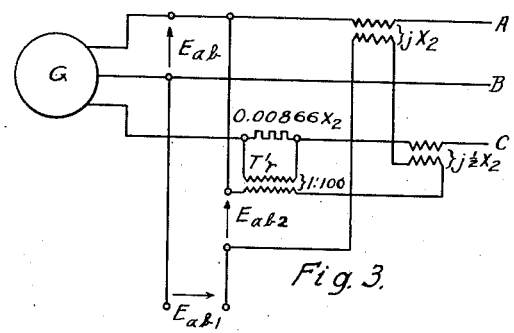

In Fig. 3, no potential transformer is used, and I utilize two mutual reactors $jX_2$ and $j\tfrac{1}{2}X_2$ of the current-transformer type, one in the phase-A line-conductor and the other in the phase-C line-conductor. By way of example, a small resistor of $0.00866X_2$ ohms is connected directly in series with the phase-C line-conductor, and shunted by a transformer $T'_r$ having a 1:100 ratio. As in Figs. 1 and 2, the secondary circuit of the voltage-producing network of Fig. 3 is so connected as to produce a positive-sequence delta-voltage $$\begin{aligned}E_{ab1} &= E_{ab} - E_{ab2}\\ &= E_{ab} - 0.866X_2I_c + jX_2I_a + j\tfrac{1}{2}X_2I_c\end{aligned} \qquad (15)$$

which corresponds to Equation 13 in a system in which $I_0=0$ and $R_2=0$.

Figure 4:
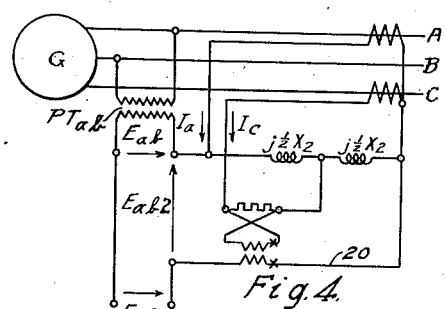

In Fig. 4, the voltage-producing network differs from the network shown in Fig. 1 in having two serially connected reactors $j\tfrac{1}{2}X_2$, one traversed by $I_a$, and the other traversed by $(I_a+I_c)$, the two reactors being serially included in the voltage-circuit 20, so that their impedance-drops are added in the voltage-circuit.

Figure 5:
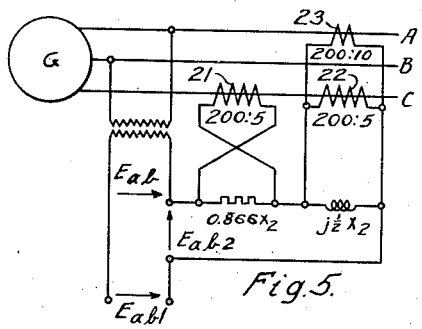

Fig. 5 shows still another arrangement in which two 200-to-5-ratio current-transformers 21 and 22 are connected in the phase-C line-conductor C, and a 200-to-10-ratio current-transformer 23 is connected in the phase-A line-conductor A. The voltage-circuit 20 includes one resistor $0.866X_2$ and one reactor $j\tfrac{1}{2}X_2$. The current-transformer 21 circulates the current $-I_c$ through the resistor $0.866X_2$, and the two current-transformers 22 and 23, in parallel, circulate the current $(2I_a+I_c)$ through $j\tfrac{1}{2}X_2$, producing the voltages indicated in Equation 15.

In all of Figs. 1 to 5, and in the mathematical derivations, proper combinations of the delta-currents of the line could have been utilized instead of star-currents, or a star-voltage of the line could have been utilized instead of the delta-voltage $E_{ab}$, or the negative-sequence current could have been derived and passed directly through the negative-sequence impedance $$(R_2+jX_2)$$

to produce the negative-sequence voltage-component $$E_{ab2} = -I_2(R_2+jX_2)$$

Thus, if delta-currents were utilized, instead of star-currents, utilizing the transformation $$I_{ab} = (I_a-I_b),\ I_{bc} = (I_b-I_c),\ I_{ca}(I_c-I_a)$$

we could start with the equation for the negative-sequence delta-current $$\begin{aligned}I_{ab2} &= \tfrac{1}{3}(I_{ab}+a^2I_{bc}+aI_{ca}) \qquad (16)\\ &= \tfrac{1}{3}[(I_a-I_b)+a^2(I_b-I_c)+a(I_c-I_a)]\\ &= \tfrac{1}{3}[(1-a)I_a+(a^2-1)I_b+(a-a^2)I_c]\\ &= \tfrac{1}{3}(1-a)(I_a+a^2I_b+aI_c)\\ &= (1-a)I_2 \qquad (17)\end{aligned}$$

whence we have $$\begin{aligned}I_2 &= \tfrac{1}{3}(1-a^2)I_{ab2}\\ &= \tfrac{1}{9}(1-a^2)(I_{ab}+a^2I_{bc}+aI_{ca})\\ &= \tfrac{1}{9}[(1-a^2)I_{ab}-(a-a^2)I_{bc}-(1-a)I_{ca}] \qquad (6^*)\end{aligned}$$

instead of Equation 6.

Since the delta-phase line-currents $I_{ab}$, $I_{bc}$ and $I_{ca}$ are, by definition, differential currents $(I_a-I_b)$, etc., they have no zero-sequence component, or $I_{ab0}$, and we can eliminate any one of the delta-currents from Equation 6* by using the equation $$I_{ab}+I_{bc}+I_{ca}=0 \qquad (7^*)$$

Then $$I_2 = \tfrac{1}{3}(-a^2 I_{ab} + a I_{ca}) \qquad (11^*)$$
$$= \tfrac{1}{3}(a^2 I_{bc} - I_{ca}) \qquad (11^{*\prime})$$
$$= \tfrac{1}{3}(I_{ab} - a I_{bc}) \qquad (11^{*\prime\prime})$$

$$E_{ab1} = E_{ab} + (1-a)(R_2+jX_2)I_2 \qquad (12)$$
$$= E_{ab} + \tfrac{1}{3}(1-a^2)(R_2+jX_2)I_{ab}$$
$$\qquad + \tfrac{1}{3}(a-a^2)(R_2+jX_2)I_{ca}$$

$$= E_{ab} - \tfrac{1}{3}(1-a^2)(R_2+jX_2)I_{bc}$$
$$\qquad - \tfrac{1}{3}(1-a)(R_2+jX_2)I_{ca}$$

$$= E_{ab} + \tfrac{1}{3}(1-a)(R_2+jX_2)I_{ab}$$
$$\qquad - \tfrac{1}{3}(a-a^2)(R_2+jX_2)I_{bc}$$

$$= E_{ab} - (\tfrac{1}{6}\sqrt{3}X_2 - \tfrac{1}{2}R_2)I_{ab}$$
$$\qquad + j(\tfrac{1}{2}X_2 + \tfrac{1}{6}\sqrt{3}R_2)I_{ab} +$$
$$\qquad - \tfrac{1}{3}\sqrt{3}X_2 I_{ca} + j\tfrac{1}{3}\sqrt{3}R_2 I_{ca} \qquad (13^*)$$

$$= E_{ab} + \tfrac{1}{3}\sqrt{3}X_2 - \tfrac{1}{2}R_2)I_{bc}$$
$$\qquad -j(\tfrac{1}{2}X_2 + \tfrac{1}{6}\sqrt{3}R_2)I_{bc} +$$
$$\qquad - (\tfrac{1}{6}\sqrt{3}X_2 + \tfrac{1}{2}R_2)I_{ca}$$
$$\qquad -j(\tfrac{1}{2}X_2 - \tfrac{1}{6}\sqrt{3}R_2)I_{ca} \qquad (13^{*\prime})$$

$$= E_{ab} + (\tfrac{1}{6}\sqrt{3}X_2 + \tfrac{1}{2}R_2)I_{ab}$$
$$\qquad + j(\tfrac{1}{2}X_2 - \tfrac{1}{6}\sqrt{3}R_2)I_{ab} +$$
$$\qquad + \tfrac{1}{3}\sqrt{3}X_2 I_{bc} - j\tfrac{1}{3}\sqrt{3}R_2 I_{bc} \qquad (13^{*\prime\prime})$$

To give only one illustration of one of the three preceding equations, in a system in which $R_2=0$, we may rewrite Equation 13* as $$E_{ab1} = E_{ab} - 0.577 X_2 I_{ca} - 0.289 X_2 I_{ab} + j0.5 X_2 I_{ab} \qquad (15^*)$$

Fig. 6 shows a modification of Fig. 5 in conformity with Equation 15*. The system shown in Fig. 6 uses three pairs of differentially connected current-transformers 24, 25 and 26 for deriving the delta line-currents $I_{ca}$, $I_{ab}$ and $I_{ab}$, respectively, and a voltage-circuit 20* including two resistors 27 and 28 of $0.289X_2$ ohms, and a reactor 29 of $0.5X_2$ ohms. The current-transformers 24 circulate the current $-I_{ca}$ through both of the resistors 27 and 28; the current-transformers 25 circulate an additional current $-I_{ab}$ through one of the resistors, 28; and the current-transformers 26 circulate the current $I_{ab}$ through the reactor 29, producing the voltage-drops called for in Equation 15*.

In like manner, star-voltages could be utilized, instead of delta-voltages, provided that the zero-sequence component were absent from, or removed from, the star-voltages. The delta-voltage $E_{ab}$ in Equation 3 is a single phase of a three-phase line-voltage having no zero-sequence voltage-component, so that said single phase is equal to the sum of the positive and negative-sequence components. The generality of this statement can be perceived from Equation 1, from which it is evident that the positive-sequence star-voltage component (or in general, the positive-sequence voltage, either star or delta) is $$E_1 = (E_a - E_0) - E_2 \qquad (4°)$$

which corresponds to Equation 4.

Specifically considering the star voltages, or line-to-neutral voltages, $E_a$, $E_b$, $E_c$, we have, therefore, $$E_1 = (E_a - E_0) - E_2 \qquad (4°)$$
$$= (E_a - E_0) + (R_2 + jX_2)I_2 \qquad (12°)$$
$$= (E_a - E_0) - (\tfrac{1}{6}\sqrt{3}X_2 - \tfrac{1}{2}R_2)(I_a - I_0)$$
$$\qquad + j(\tfrac{1}{2}X_2 + \tfrac{1}{6}\sqrt{3}R_2)(I_a - I_0) +$$
$$\qquad - \tfrac{1}{3}\sqrt{3}X_2(I_c - I_0) + j\tfrac{1}{3}\sqrt{3}R_2(I_c - I_0) \qquad (13°)$$

$$= (E_a - E_0) + (\tfrac{1}{6}\sqrt{3}X_2 - \tfrac{1}{2}R_2)(I_b - I_0)$$
$$\qquad -j(\tfrac{1}{2}X_2 + \tfrac{1}{6}\sqrt{3}R_2)(I_b - I_0) +$$
$$\qquad - (\tfrac{1}{6}\sqrt{3}X_2 + \tfrac{1}{2}R_2)(I_a - I_0) - j(\tfrac{1}{2}X_2$$
$$\qquad - \tfrac{1}{6}\sqrt{3}R_2)(I_a - I_0) \qquad (13°')$$

$$= (E_a - E_0) + (\tfrac{1}{6}\sqrt{3}X_2 + \tfrac{1}{2}R_2)(I_a - I_0) +$$
$$\qquad j(\tfrac{1}{2}X_2 - \tfrac{1}{6}\sqrt{3}R_2)(I_a - I_0)$$
$$\qquad + \tfrac{1}{3}\sqrt{3}X_2(I_b - I_0) - j\tfrac{1}{3}\sqrt{3}R_2(I_b - I_0) \qquad (13°'')$$

$$= (E_a - E_0) - (\tfrac{1}{6}\sqrt{3}X_2 - \tfrac{1}{6}R_2)I_{ab} +$$
$$\qquad j(\tfrac{1}{6}X_2 + \tfrac{1}{6}\sqrt{3}R_2)I_{ab} +$$
$$\qquad - (\tfrac{1}{6}\sqrt{3}X_2 + \tfrac{1}{6}R_2)I_{ca} - j(\tfrac{1}{6}X_2 -$$
$$\qquad \tfrac{1}{6}\sqrt{3}R_2)I_{ca} \qquad (13°*)$$

$$= (E_a - E_0) + (\tfrac{1}{6}\sqrt{3}X_2 - \tfrac{1}{6}R_2)I_{bc} -$$
$$\qquad j(\tfrac{1}{6}X_2 + \tfrac{1}{6}\sqrt{3}R_2)I_{bc} +$$
$$\qquad - \tfrac{1}{3}R_2 I_{ca} - j\tfrac{1}{3}X_2 I_{ca} \qquad (13°*')$$

$$= (E_a - E_0) + \tfrac{1}{3}R_2 I_{ab} + j\tfrac{1}{3}X_2 I_{ab} +$$
$$\qquad (\tfrac{1}{6}\sqrt{3}X_2 + \tfrac{1}{6}R_2)I_{bc} +$$
$$\qquad + j(\tfrac{1}{6}X_2 - \tfrac{1}{6}\sqrt{3}R_2)I_{bc} \qquad (13°*'')$$

Choosing the last one, of the last six equations, for illustration, in a system in which $R_2=0$, and deriving the delta-currents $I_{ab}$ and $I_{bc}$ with differentially connected star-current transformers, so that the zero-sequence delta-current $I_{ab0}$ is eliminated, Equation 13°*'' may be rewritten as $$E_1 = (E_a - E_0) + j0.333 X_2(I_a - I_b) + (0.289 X_2 + j0.167 X_2)(I_b - I_c) \qquad (18)$$

The conditions expressed in Equation 18 are fulfilled in the system shown in Fig. 7, wherein the star-connected secondary of the power-transformer T' is grounded at 31, and the potential-transformer PT is in the form of a star-delta-star three-winding transformer-bank, with the delta-connected windings short-circuited, as indicated at 32, to eliminate the zero-sequence star-voltage component $E_0$. Two pairs of differentially connected line-current transformers 34 and 35 produce the currents $I_{ab}=(I_a-I_b)$ and $I_{bc}=(I_b-I_c)$, respectively. The current $I_{ab}$ is circulated in an inductance $j0.333X_2$ in the secondary voltage-circuit 20°, and the current $I_{bc}$ is circulated in an impedance $(0.289X_2+j0.167X_2)$, which is also connected in the voltage secondary circuit 20°. The star voltage $(E_a-E_0)$ is derived from the potential transformer PT and connected in series with the impedances $j0.333X_2$, $0.289X_2$ and $j0.167X_2$ in the circuit 20°, thus fulfilling the conditions of Equation 18.

I have thus provided a new manner and means, for deriving the positive-sequence delta-voltage $E_{ab1}$ of a three-phase line, or for deriving the positive-sequence star-voltage $$E_1 = (1-a)E_{ab1}$$

Fundamentally, my new system comprises the means and method of subtracting the current-derived negative-sequence voltage-component from the principal phase, $E_a$ or $E_{ab}$, of the line-voltage, after having removed the zero-sequence component from $E_a$ or $E_{ab}$, if any zero-sequence voltage-component was present. This is broadly expressed in Equations 12 and 12°. The current-derived negative-sequence voltage-component, $E_2=(1-a^2)E_{ab2}$, is obtained by passing the reversed negative-sequence current $$I_2 = \tfrac{1}{3}(1-a^2)I_{ab2}$$

through the negative sequence line-impedance $(R_2+jX_2)$, that is, through the negative-sequence line-impedance up to the point at which the voltage is to be determined. This is as expressed in Equation 5, with the star-delta current-transformations as defined by the equations $I_{ab}=I_a-I_b$, $I_{bc}=I_b-I_c$ and $I_{ca}=I_c-I_a$. The negative-sequence current may be derived separately and passed through the negative-sequence impedance $(R_2+jX_2)$, or any equivalent combinations of currents may be substituted, as set forth in Equations 11, 11′, 11″, 11*, 11*′, or 11*″. Thus I produce a positive-sequence voltage-response according to any one of a group of relationships expressed by Equations 12, 13, 13′, 13″, 13*, 13*′, 13*″, 12°, 13°, 13°′, 13°″, 13°*, 13°*′, and 13°*″.

My new positive-sequence voltage-deriving system may be called a compensator-system, as distinguished from a sequence-network or other phase-sequence means, because my new system utilizes the compensator-method of modifying a potential-transformer voltage. Thus I add (or subtract) voltage-drops obtained by passing predetermined line-derived currents through predetermined impedances. In its broadest aspects, my invention contemplates any compensator-network which simulates the negative-sequence voltage-drop in the generator and in the line up to any given point, said negative-sequence voltage-drop being subtracted from any line-voltage phase having no zero-sequence voltage-component, so as to produce a resultant-voltage equal to the positive-sequence component.

My invention is particularly useful in a voltage-regulator system of the type symbolically indicated in Fig. 8, the term voltage-regulator being utilized in the sense of a source of derived voltage, such as the voltage $E_{ab1}$, which energizes a variable load, which requires consideration of the variation of the derived voltage at the load-terminals, when the load of the voltage-regulator varies between zero and full-load. Thus, in Fig. 8, a first rectangle 41 indicates the potential-transformer $PT_{ab}$ or other source of derived line-voltage, a second rectangle 42 indicates the compensator-network, corresponding, for example, to the secondary winding of the transformer $T_r$ in Fig. 1 and the mutual-reactance secondary winding $W_s$, and a third rectangle 43 indicates a variable-load voltage-regulator network consisting of various variable shunt-loads 44 and 45, connected by a serially connected impedance 46.

Calculations have shown that my compensator-system of positive-sequence voltage-derivation, as broadly symbolized in Fig. 8, is much more advantageous than any of the standard negative-sequence voltage-networks, as it imposes a much smaller volt-ampere burden on the source 41 of line-derived voltage when supplying a heavy volt-ampere load at 43, and it also has a much better voltage-regulation between no load and full load on the output-terminals $E_{ab1}$ of the positive-sequence voltage-segregating combination. I obtain these benefits mainly by reason of the lower impedance of my compensator-network 42, for deriving the negative-sequence voltage, as compared to the impedance required in a conventional positive-sequence voltage-network utilizing voltages rather than currents.

Various modifications and special uses may be made of my system. Thus, the compensator-network 42 of Fig. 8, or the corresponding sources of the negative-sequence voltage $E_{ab2}$ or $E_2$ in Figs. 1 to 7, may be utilized alone, as a source of derived negative-sequence line-voltage, for energizing any device requiring a negative-sequence voltage.

It is not always necessary or desirable to utilize very close approximations of the equivalent values of the negative-sequence resistance $R_2$ and reactance $jX_2$ of the line, up to the voltage-measuring point. By deliberately departing slightly from the absolutely correct values of the resistors and reactors utilized in the compensator-part of my positive-sequence voltage-deriving means, I may obtain a voltage which is larger or smaller than the positive-sequence component $E_{ab1}$, by an increment or decrement depending upon the load on the generator G, thus providing cross-current compensation for parallel operation with other generators or regulators (not shown). One means for accomplishing such a purpose is indicated in Fig. 1, wherein a resistance-changing tap 48 is provided on the resistor $0.866X_2$. Whenever I refer to values approximating the values necessary to obtain certain results, I contemplate such deliberate departures as have just been discussed.

In the foregoing derivations, I have utilized a single phase of a three-phase line-voltage, and two phases of a three-phase line-current, with suitable impedances traversed by the two current-phases to produce a voltage-drop of substantially $(R_2+jX_2)I_2$. It is noted that these three-phase line-voltages or line-currents may be either star-quantities or delta-quantities, each phase of the delta-quantities being defined as the difference between two star-quantities. Or a more complicated three-phase line-voltage or line-current may be utilized, each phase being made up of two (or more) delta or star phases of the line-voltage or current, vectorially combined in any manner and in any relative magnitudes, such, for example, as a set of three-phase line-quantities (voltage or current) made up as follows, $$\text{For phase-}A,\ KQ_A+LQ_B+MQ_C \atop \text{For phase-}B,\ KQ_B+LQ_C+MQ_A \atop \text{For phase-}C,\ KQ_C+LQ_A+MQ_B \quad (19)$$

where $Q_A$, $Q_B$, $Q_C$ are the three-phase star or delta line-voltages or currents, and K, L and M are any constants or vector-quantities. It is to be understood, of course, that the appropriate changes are to be made in the magnitudes and vector-relations of my compensator-impedances when such unusual transformations are used.

I claim as my invention:

1. A positive-sequence voltage-deriving combination, comprising means for deriving a single phase of a three-phase line-voltage having no zero-sequence voltage-component, means for causing line-current to pass through impedance in such manner as to produce a voltage-drop substantially corresponding to the negative-sequence line-voltage, and means for causing said voltage-drop to be subtracted from said single phase of the line-voltage to produce substantially the positive-sequence component of the line-voltage.

2. A positive-sequence voltage-deriving combination, comprising means for deriving a single phase of a three-phase line-voltage having no zero-sequence voltage-component, means for causing line-current to pass through impedance in such manner as to substantially produce the voltage-drop $(R_2+jX_2)I_2$, where $(R_2+jX_2)$ is the negative-sequence impedance of the line up to the voltage-measuring point, and $I_2$ is the negative-sequence component of the line-current, and means for causing said voltage-drop to be added to said single phase of the line-voltage to produce substantially the positive-sequence line-voltage.

3. A positive-sequence voltage-deriving combination, comprising means for deriving a single phase of a three-phase line-voltage having no zero-sequence voltage-component, means for deriving two phases of a three-phase line-current having no zero-sequence current-component, means for causing said two phases of line-current to pass through impedances of such value as to substantially produce the voltage-drop $(R_2+jX_2)I_2$, where $(R_2+jX_2)$ is the negative sequence impedance of the line up to the voltage-measuring point, and $I_2$ is the negative-sequence component of the line-current, and means for causing said voltage-drop to be added to said single phase of the line-voltage to produce substantially the positive-sequence line-voltage.

4. A positive-sequence voltage-deriving combination, comprising means for deriving a single phase of a three-phase line-voltage having no zero-sequence voltage-component, and compensator-means for modifying the derived voltage, said compensator-means including impedance substantially corresponding to the negative-sequence line-impedance, and means for causing line-current to traverse said impedance in such manner as to produce compensator-voltage substantially corresponding to the negative-sequence line-voltage, characterized by said combination of derived line-voltage and compensator-voltage having substantially a relationship which is equivalent to the mathematical expression, $$E_{ab1}=E_{ab}+(1-a)(R_2+jX_2)I_2$$

where the letters E and I represent line-voltages and line-currents, respectively, the subscript $ab$ designates a delta-phase from which any zero-sequence component has been removed, the subscripts 1 and 2 designate positive-sequence and negative-sequence components, respectively, and $(R_2+jX_2)$ is the negative-sequence impedance of the line up to the voltage-measuring point.

5. A positive-sequence voltage-deriving combination, comprising means for deriving a single phase of a three-phase line-voltage having no zero-sequence voltage-component, means for deriving two phases of a three-phase line-current having no zero-sequence current-component, and compensator means for modifying the derived voltage, said compensator-means including impedances substantially corresponding to the negative-sequence line-impedance, and means for causing said two line-current phases to traverse said impedances in such manner as to produce compensator-voltage substantially corresponding to the negative-sequence line-voltage, characterized by said combination of derived line-voltage and compensator-voltage having substantially a relationship which is equivalent to the mathematical expression, $$E_1=E_a-(\tfrac{1}{6}\sqrt{3}X_2-\tfrac{1}{2}R_2)I_a+j(\tfrac{1}{2}X_2+\tfrac{1}{6}\sqrt{3}R_2)I_a-\tfrac{1}{3}\sqrt{3}X_2I_c++j\tfrac{1}{3}\sqrt{3}R_2I_c$$

where the letters E and I represent line-voltages and line-currents, respectively, the subscripts $a$ and $c$ designate star-phases from which any zero-sequence component has been removed, the subscripts 1 and 2 designate positive-sequence and negative-sequence components, respectively, and $(R_2+jX_2)$ is the negative-sequence impedance of the line up to the voltage-measuring point.

6. A positive-sequence voltage-deriving combination, comprising means for deriving a single phase of a three-phase line-voltage having no zero-sequence voltage-component, means for deriving two phases of a three-phase line-current having no zero-sequence current-component, and compensator-means for modifying the derived voltage, said compensator-means including impedances and means for causing said two line-current phases to traverse said impedances to produce compensator-voltage, characterized by said combination of derived line-voltage and compensator-voltage having substantially the relation, $$E_{ab1}=E_{ab}+R_2I_a+jX_2I_a-(\tfrac{1}{2}\sqrt{3}X_2-\tfrac{1}{2}R_2)I_c+j(\tfrac{1}{2}X_2+\tfrac{1}{2}\sqrt{3}R_2)I_c$$

where $E_{ab}$ is the derived delta line-voltage, $I_a$ and $I_c$ are the derived star line-currents, and $(R_2+jX_2)$ is the negative-sequence impedance of the line up to the voltage-measuring point.

7. A positive-sequence voltage-deriving combination, comprising means for deriving a single phase of a three-phase line-voltage having no zero-sequence voltage-component, means for deriving two phases of a three-phase line-current having no zero-sequence current-component, and compensator-means for modifying the derived voltage, said compensator-means including impedances and means for causing said two line-current phases to traverse said impedances to produce compensator-voltage, characterized by said combination of derived line-voltage and compensator-voltage having substantially the relation, $$E_{ab1}=E_{ab}-R_2I_b-jX_2I_b-(\tfrac{1}{2}\sqrt{3}X_2+\tfrac{1}{2}R_2)I_c-j(\tfrac{1}{2}X_2-\tfrac{1}{2}\sqrt{3}R_2)I_c$$

where $E_{ab}$ is the derived delta line-voltage, $I_b$ and $I_c$ are the derived star line-currents, and $(R_2+jX_2)$ is the negative-sequence impedance of the line up to the voltage-measuring point.

8. A positive-sequence voltage-deriving combination, comprising means for deriving a single phase of a three-phase line-voltage having no zero-sequence voltage-component, means for deriving two phases of a three-phase line-current having no zero-sequence current-component, and compensator-means for modifying the derived voltage, said compensator-means including impedances and means for causing said two line-current phases to traverse said impedances to produce compensator-voltage, characterized by said combination of derived line-voltage and compensator-voltage having substantially the relation, $$E_{ab1}=E_{ab}+(\tfrac{1}{2}\sqrt{3}X_2+\tfrac{1}{2}R_2)I_a+j(\tfrac{1}{2}X_2-\tfrac{1}{2}\sqrt{3}R_2)I_a++(\tfrac{1}{2}\sqrt{3}X_2-\tfrac{1}{2}R_2)I_b-j(\tfrac{1}{2}X_2+\tfrac{1}{2}\sqrt{3}R_2)I_b$$

where $E_{ab}$ is the derived delta line-voltage, $I_a$ and $I_b$ are the derived star line-currents, and $(R_2+jX_2)$ is the negative-sequence impedance of the line up to the voltage-measuring point.

9. Means for deriving the negative-sequence voltage-component from a three-phase line, comprising means for deriving two phases of a three-phase line-current having no zero-sequence current-component, a plurality of serially connected impedances, and means for causing said two phases of line-current to pass through said impedances, the impedances and currents being of such values as to substantially produce the voltage-drop $(R_2+jX_2)I_2$, where $(R_2+jX_2)$ is the negative-sequence impedance of the line up to the voltage-measuring point, and $I_2$ is the negative-sequence component of the line-current.

10. Means for deriving the negative-sequence voltage-component from a three-phase line, comprising means for deriving two phases of a three-phase line-current having no zero-sequence current-component, a plurality of serially connected impedances substantially corresponding to the negative-sequence line-impedance, and means for causing said two phases of line-current to pass through said impedances in such manner as to produce a total voltage-drop substantially corresponding to the negative-sequence line-voltage, the impedances and currents being of such values as to have substantially a relationship which is equivalent to the mathematical expression, $$E_{ab2} = -R_2 I_a - j X_2 I_a + (\tfrac{1}{2}\sqrt{3} X_2 - \tfrac{1}{2} R_2) I_c - j(\tfrac{1}{2} X_2 + \tfrac{1}{2}\sqrt{3} R_2) I_c$$

where the letters E and I represent line-voltages and line-currents, respectively, the subscripts $a$ and $c$ designate star-phases from which any zero-sequence component has been removed, the subscript 2 designates the negative-sequence component, and $(R_2+jX_2)$ is the negative-sequence impedance of the line up to the voltage-measuring point.

11. Means for deriving the negative-sequence voltage-component from a three-phase line, comprising means for deriving two phases of a three-phase line-current having no zero-sequence current-component, a plurality of serially connected impedances, and means for causing said two phases of line-current to pass through said impedances, the impedances and currents being of such values as to have substantially the relation, $$E_{ab2} = -R_2 I_a - j X_2 I_a + (\tfrac{1}{2}\sqrt{3} X_2 - \tfrac{1}{2} R_2) I_c - j(\tfrac{1}{2} X_2 + \tfrac{1}{2}\sqrt{3} R_2) I_c$$

where $E_{ab2}$ is the derived negative-sequence delta line-voltage, $I_a$ and $I_c$ are the derived star line-currents, and $(R_2+jX_2)$ is the negative-sequence impedance of the line up to the voltage-measuring point.

12. Means for deriving the negative-sequence voltage-component from a three-phase line, comprising means for deriving two phases of a three-phase line-current having no zero-sequence current-component, a plurality of serially connected impedances, and means for causing said two phases of line-current to pass through said impedances, the impedances and currents being of such values as to have substantially the relation, $$E_{ab2} = R_2 I_b + j X_2 I_b + (\tfrac{1}{2}\sqrt{3} X_2 + \tfrac{1}{2} R_2) I_c + j(\tfrac{1}{2} X_2 - \tfrac{1}{2}\sqrt{3} R_2) I_c$$

where $E_{ab2}$ is the derived negative-sequence delta line-voltage, $I_b$ and $I_c$ are the derived star line-currents, and $(R_2+jX_2)$ is the negative-sequence impedance of the line up to the voltage-measuring point.

13. Means for deriving the negative-sequence voltage-component from a three-phase line, comprising means for deriving two phases of a three-phase line-current having no zero-sequence current-component, a plurality of serially connected impedances, and means for causing said two phases of line-current to pass through said impedances, the impedances and currents being of such values as to have substantially the relation, $$E_{ab2} = -(\tfrac{1}{2}\sqrt{3} X_2 + \tfrac{1}{2} R_2) I_a - j(\tfrac{1}{2} X_2 - \tfrac{1}{2}\sqrt{3} R_2) I_a + -(\tfrac{1}{2}\sqrt{3} X_2 - \tfrac{1}{2} R_2) I_b + j(\tfrac{1}{2} X_2 + \tfrac{1}{2}\sqrt{3} R_2) I_b$$

where $E_{ab2}$ is the derived negative-sequence delta line-voltage, $I_a$ and $I_b$ are the derived star line-currents, and $(R_2+jX_2)$ is the negative-sequence impedance of the line up to the voltage-measuring point.

14. The positive-sequence voltage-deriving combination as defined in claim 1, in combination with a variable load-device therefor, requiring consideration of the variation of the derived positive-sequence voltage at the load-terminals, when said load varies.

15. The positive-sequence voltage-deriving combination as defined in claim 2, in combination with a variable load-device therefor, requiring consideration of the variation of the derived positive-sequence voltage at the load-terminals, when said load varies.

16. The positive-sequence voltage-deriving combination as defined in claim 3, in combination with a variable load-device therefor, requiring consideration of the variation of the derived positive-sequence voltage at the load-terminals, when said load varies.

17. The positive-sequence voltage-deriving combination as defined in claim 4, in combination with a variable load-device therefor, requiring consideration of the variation of the derived positive-sequence voltage at the load-terminals, when said load varies.

18. The positive-sequence voltage-deriving combination as defined in claim 5, in combination with a variable load-device therefor, requiring consideration of the variation of the derived positive-sequence voltage at the load-terminals, when said load varies.

19. The positive-sequence voltage-deriving combination as defined in claim 6, in combination with a variable load-device therefor, requiring consideration of the variation of the derived positive-sequence voltage at the load-terminals, when said load varies.

20. The positive-sequence voltage-deriving combination as defined in claim 7, in combination with a variable load-device therefor, requiring consideration of the variation of the derived positive-sequence voltage at the load-terminals, when said load varies.

21. The positive-sequence voltage-deriving combination as defined in claim 8, in combination with a variable load-device therefor, requiring consideration of the variation of the derived positive-sequence voltage at the load-terminals, when said load varies.

EDWIN L. HARDER.

REFERENCES CITED

The following references are of record in the file of this patent:

UNITED STATES PATENTS

| Number | Name | Date |
|---|---|---|
| 1,963,195 | Freidlander | June 19, 1934 |